June 3, 1952 — R. RUBENSTEIN ET AL — 2,599,201
AXIAL FLOW TURBINE OIL LINE FLOW INDICATOR
Filed March 11, 1950
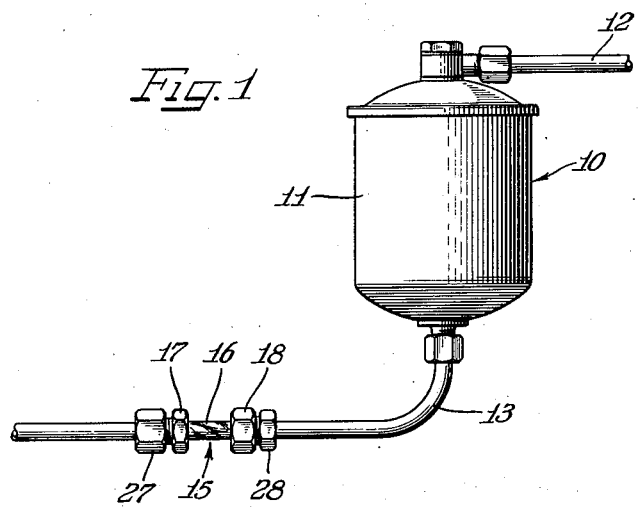
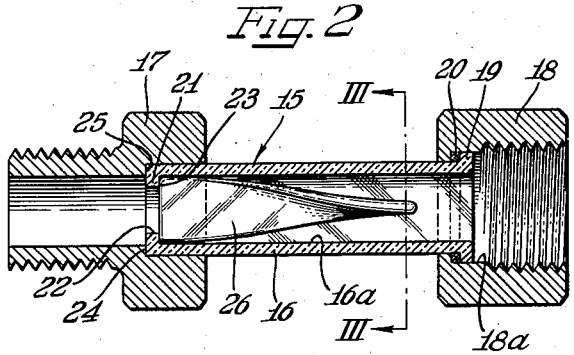 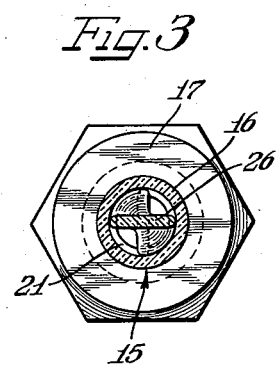
Inventors
Robert Rubenstein &
Sidney I. Groban
by The Firm of Charles W. Hills
Attys Patented June 3, 1952

2,599,201

UNITED STATES PATENT OFFICE 2,599,201

AXIAL FLOW TURBINE OIL LINE FLOW INDICATOR

Robert Rubenstein and Sidney I. Groban, Chicago, Ill.

Application March 11, 1950, Serial No. 149,116

3 Claims. (Cl. 116—117)

The present invention relates to a fluid flow indicator and more particularly to an axial flow turbine oil line flow indicator.

In the prior art, many various types of fluid flow indicators have been proposed. Such indicators are generally bulky, relatively intricate in design and expensive to manufacture. Also, typical flow indicators heretofore proposed have substantially restricted the flow of fluid therethrough, so as to interfere with fluid flow and cause undue turbulence therein.

The present invention now provides an extremely simple fluid flow indicator which is small in overall size, inexpensive to manufacture, and operable without interfering substantially with fluid flow therethrough. The indicator of the present invention is particularly adapted for use in the oil or other lubricant line of an internal combustion engine, such as an automotive engine. The lubrication systems of such engines are conventionally equipped with oil filters which may become clogged during use so as to hinder lubricant flow and a visual indication of lubricant flow through the system and particularly through the filter would be highly desirable. The fluid flow indicators heretofore available have not been suitable for such use due to their expense, size, and/or interference with fluid flow through a relatively small conduit.

The indicator of the present invention comprises generally a tubular casing formed of transparent material, such as glass, or a synthetic plastic, for example methyl-methacrylate. An elongated rotor or vane is journaled by the casing for axial rotation therein, the rotor preferably being formed of sheet or ribbon stock twisted about its longitudinal axis to provide a vane configuration. The casing is formed with an integral inwardly directed radial flange for providing a stop for the rotor to prevent displacement thereof from the casing under the influence of fluid flow. The casing is secured within suitable coupling members for facilitating the insertion of the indicator in a fluid flow line.

It is, therefore, an important object of the present invention to provide a simple, inexpensive fluid flow indicator adapted for the flow of fluid therethrough without substantial hindrance.

Another important object of the present invention is to provide a fluid flow indicator including the transparent casing journaling therein for rotation a rotor, the casing being transparent to permit visual inspection of the rotor and the ready determination of fluid flow through the casing.

Another important object of the present invention is to provide an improved fluid flow indicator including a casing having a generally cylindrical bore journaling therein for rotating an elongated vane, the vane being bottomed against one end of the casing and being guided peripherally for rotation by the inner walls of the casing.

Other and further important objects of this invention will be apparent from the disclosures in the specification and the accompanying drawings.

On the drawings:

Figure 1 is a fragmentary elevational view of an oil filter and flow lines for an internal combustion engine equipped with a flow indicator of the present invention;

Figure 2 is an axial sectional view of a flow indicator of the present invention; and Figure 3 is a sectional view taken along the plane III—III of Figure 2.

As shown on the drawings:

In Figure 1, reference numeral 10 refers generally to an internal combustion engine lubricant system of conventional design including a lubricant filter confined within a filter housing 11 and adapated to receive lubricant from an inlet line 12 and to return lubricant to the lubrication system 16 through an outlet line 13.

As indicated generally by reference numeral 15, the flow indicator of the present invention is interposed in the outlet line 13 leading from the filter 11. Oil or other lubricant flows through the system from the filter and passes through the indicator, and the indicator serves to give a visual indication of flow therethrough. Thus, if the filter 11 is clogged so that flow therethrough is restricted or entirely impeded, this condition will be indicated visually at the flow indicator. Of course, it will be appreciated that the indicator 15 may be interposed in the filter inlet line 12, inasmuch as the lubrication system generally is a closed circuit, and back pressure generated by the filter will prevent flow through the inlet line 12 as well as through the outlet line 13.

The indicator 15 (Figure 2) includes a transparent casing 16 interposed between a pair of adaptors, including a male adaptor 17 and a female adaptor 18. The casing is formed of transparent material, such as glass or a suitable plastice such as methyl methacrylate, cellulose acetate butyrate, or the like. The casing is generally tubular and is provided with a generally cylindrical axial bore 16a terminating at one end in a radially out-turned integral flange 18 seated within an axial recess 18a of the female adaptor 18. To seal the casing in the adaptor a liquid-tight gasket 20, such as cork, is interposed between the flange 19 and the bottom of the recess 18a of the adaptor. The other end of the bore 16a terminates in a radially inturned flange 21 having a central aperture 22, the flange 21 cooperating with the casing bore 16a to define an interior annular shoulder 23. The flange 21 also defines an exterior shoulder 24 which is seated against a mating countersunk shoulder 25 in the bore of the male adaptor 17.

An axial flow rotor or vane 26 is mounted in bore 17 of casing 16, the rotor being of such size as to be journaled in the casing for rotation therein about a longitudinal axis coaxial with respect to the axis of the bore 17. The rotor 26 is formed by merely axially deflecting or twisting from planer configuration an initially plane ribbon or sheet of suitable material, such as glass or plastic, and the axial twist thus imparted to the elongated rotor 26 insures its rotation about its longitudinal axis in a moving stream of fluid, as will be well understood by those skilled in the art. The transverse dimension of the rotor 26 is substantially equivalent to the diameter of the bore 17, so that the rotor is journaled in the casing bore for rotation about its longitudinal axis. One end of the rotor abuts the flange 21 of the casing 16, and this flange is downstream of the fluid flow through the casing so that flow through the bore 16a, as from the filter 11, urges the rotor into engagement with the flange. However, engagement between the rotor and the flange is not sufficient to hinder relatively free rotation of the rotor in the bore, particularly since the fluid flowing through the bore serves to lubricate this engagement.

To assemble the indicator 15 in the line 13, it is necessary merely to provide the ends of the line 13 with adaptors 27 and 28 for threaded engagement with the adaptors 17 and 18, respectively, to secure the indicator thereto.

The advantages in the present invention will be evident to those skilled in the art from the foregoing description. The simplicity of manufacture will be evident by the journaling of the rotor 26 within the casing bore 16a, thus eliminating the necessity of a rotor shaft, as is common in the prior art. The arrangement of the casing flanges 19 and 21 is likewise advantageous, the adaptors 18 serving to retain sealing means 20 within the female adaptor 18, and the flange 21 serving to retain the rotor 26 within the bore 16a. No sealing means, other than a mere glue type seal, are necessary at the juncture of the flange 21 and the male fitting 17, inasmuch as any pressure exerted against these members will be back pressure. The seal ring or gasket 20 may be retained within the female member 18 by engagement with the fitting 28 threaded into the female adaptor 18 to abut the flange or, if desired, by the provision of adhesive means.

It will be noted that there is substantially no interference with flow through the indicator, except that resistance of the freely rotatable rotor 26. That end of the casing 17 is secured to the female member 18 and is entirely free of any restriction, while the restriction offered by the rotor-retaining flange 21 is minor. In the absence of a shaft for the rotor 26, it is not necessary to provide a spider or other shaft supporting means which would interfere with fluid flow through the casing.

It will be understood that modifications and variations may be effected without departing from the scope of the novel concepts of the present invention.

We claim as our invention:

1. A fluid flow indicator comprising a casing of transparent material having a substantially cylindrical bore and an inturned annular radial flange at one end of the bore, and an elongated axially twisted vane disposed in the bore and guided solely thereby for rotation about its longitudinal axis, said vane having a transverse dimension substantially equal to the diameter of said bore so that said vane is guided along its length by its proximity to the casing walls defining said bore, said vane in use being bottomed against said flange by fluid flow through the bore to prevent displacement of the rotor from said bore and said bore being substantially open to the free flow of fluid therethrough.

2. A fluid flow indicator comprising a casing having a transparent wall, a generally cylindrical interior bore and a radially inwardly extending annular flange at one end of said bore, and an axially twisted elongated rotor disposed in the bore and having a substantially constant transverse dimension substantially identical with the diameter of the bore so that said rotor is guided for rotation about its longitudinal axis along substantially the entire length of said rotor solely by the bore, said rotor being retained against said inturned flange solely by the flow of fluid through said bore and said bore being substantially open to the free flow of fluid therethrough.

3. In a lubrication system for an internal combustion engine including a lubricant filter and lines for introducing and removing lubricant from said filter, a lubricant flow indicator interposed in one of said lines comprising adaptors secured to said one line and having opposing interior shoulders, a transparent casing confined between said adaptors and having an interior bore, said casing having an integrally formed inturned annular flange at one end of said bore and an outturned annular flange at the other end of said bore, said casing ends being in seated relation with the interior shoulders of said adaptors, and an elongated axially twisted vane rotor disposed in said bore for abutting said inturned flange during the flow of lubricant through said bore to prevent displacement of the rotor therefrom, said rotor having a constant transverse dimension substantially identical with the diameter of the bore so that said rotor is guided for rotation about its longitudinal axis solely by the bore, and said casing inturned flange constituting the only impediment to free flow of fluid therethrough so that said bore is substantially open to fluid flow.

ROBERT RUBENSTEIN,
SIDNEY I. GROBAN.

REFERENCES CITED

The following references are of record in the file of this patent:

UNITED STATES PATENTS

| Number | Name | Date |
|---|---|---|
| 799,603 | King | Sept. 12, 1905 |